United States Patent
Li et al.

(10) Patent No.: US 11,032,032 B2
(45) Date of Patent: Jun. 8, 2021

(54) SUB-BAND CONFIGURATION FOR PREEMPTION INDICATION TO EMBB UES

(71) Applicant: QUALCOMM Incorporated, San Diego, CA (US)

(72) Inventors: Chih-Ping Li, San Diego, CA (US); Jing Jiang, San Diego, CA (US); Jing Sun, San Diego, CA (US); Heechoon Lee, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/201,709

(22) Filed: Nov. 27, 2018

(65) Prior Publication Data

US 2019/0165902 A1   May 30, 2019

Related U.S. Application Data

(60) Provisional application No. 62/591,615, filed on Nov. 28, 2017.

(51) Int. Cl.
*H04L 5/00* (2006.01)

(52) U.S. Cl.
CPC .......... *H04L 5/0005* (2013.01); *H04L 5/0042* (2013.01); *H04L 5/0064* (2013.01);
(Continued)

(58) Field of Classification Search
CPC ... H04L 5/0005; H04L 5/0042; H04L 5/0053; H04L 5/0064; H04L 5/0078; H04L 5/0094; H04L 5/0092
See application file for complete search history.

(56) References Cited

U.S. PATENT DOCUMENTS

| | | | |
|---|---|---|---|
| 2006/0034205 A1* | 2/2006 | Kim | H04W 76/40 370/312 |
| 2008/0219236 A1* | 9/2008 | Love | H04L 5/0007 370/347 |
| 2018/0270800 A1 | 9/2018 | Park et al. | |

FOREIGN PATENT DOCUMENTS

WO   2018036560 A1   3/2018

OTHER PUBLICATIONS

OPPO ("Multiplexing between slot-based and symbol-based transmissions and pre-emption indication," 3GPP Draft; R1-1718049, 3GPP TSG RAN WG1 Meeting 90bis, Prague, CZ, Oct. 9-13, 2017) (Year: 2017).*

(Continued)

*Primary Examiner* — Jamal Javaid

(57) ABSTRACT

Aspects of the present disclosure describe an indication channel for wireless communications that indicates whether an ultra-reliable low-latency communication (URLLC) transmission is present in an enhanced mobile broad band (eMBB) slot. A user equipment (UE) may receive an indication channel identifying one or more resources defined by time domain parts and frequency domain parts that have been punctured by an Ultra-Reliable Low latency Communication (URLLC) transmission. The number of frequency domain parts may be greater than or equal to two. The UE may determine a number of resource block groups (RBGs) in an active band width part (BWP) of the UE. The UE may map the RBGs in the BWP among each of a number of sub-bands equal to the number of frequency domain parts based on a pre-defined rule.

30 Claims, 7 Drawing Sheets

(52) U.S. Cl.
CPC ............ *H04L 5/0094* (2013.01); *H04L 5/001* (2013.01); *H04L 5/0044* (2013.01); *H04L 5/0048* (2013.01); *H04L 5/0053* (2013.01); *H04L 5/0078* (2013.01)

(56) References Cited

OTHER PUBLICATIONS

International Search Report and Written Opinion—PCT/US2018/062854—ISA/EPO—Mar. 8, 2019.

LG Electronics: "Remaining Issues on Pre-Emption Indication for Downlink", 3GPP Draft; R1-1717970 Remaining Issues on Pre-Emption Indication for DL_VF, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9-13, 2017 Oct. 8, 2017, XP051341154, Retrieved from the Internet: URL:http://www.3gpp.org/ftp/Meetings_3GPP_SYNC/RAN1/Docs/ [retrieved on Oct. 8, 2017], Sect.s 1, 3, 15 pages.

OPPO: "Multiplexing between Slot-based and Symbol-based Transmissions", 3GPP Draft; R1-1718049, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9-13, 2017 Oct. 8, 2017, XP051341231, Retrieved from the Internet: URL:http://www.3gpp.org/ftp/Meetings_3GPP_SYNC/RAN1/Docs/ [retrieved on Oct. 8, 2017], Sect.s 1-4, 5 pages.

OPPO: "PDCCH for URLLC", 3GPP Draft; R1-1719970, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017 (Nov. 8, 2017), XP051369666, Retrieved from the Internet: URL:http://www.3gpp.org/ftp/tsg%5Fran/WG1%5FRL1/TSGR1%5F91/Docs/ [retrieved on Nov. 18, 2017], Sect.s 1-3, 5 pages Qualcomm Incorporated: "URLLC DL Pre-Emption and UL Suspension Indication Channel Design", 3GPP Draft; R1-1720692 URLLC DL Pre-Emption and UL Suspension Indication Channel Design, 3rd Generation Partnership Project (3GPP), Mobile Competence Centre; 650, Route Des Lucioles; F-06921 Sophia-Antipolis Cedex; France, vol. RAN WG1, No. Reno, Nevada, US; Nov. 27, 2017-Dec. 1, 2017 Nov. 18, 2017, XP051370153, Retrieved from the Internet: URL:http://www.3gpp.org/ftp/tsg%5Fran/WG1%5FRL1/TSGR1%5F91/Docs/ [retrieved on Nov. 18, 2017], 10 pages.

* cited by examiner

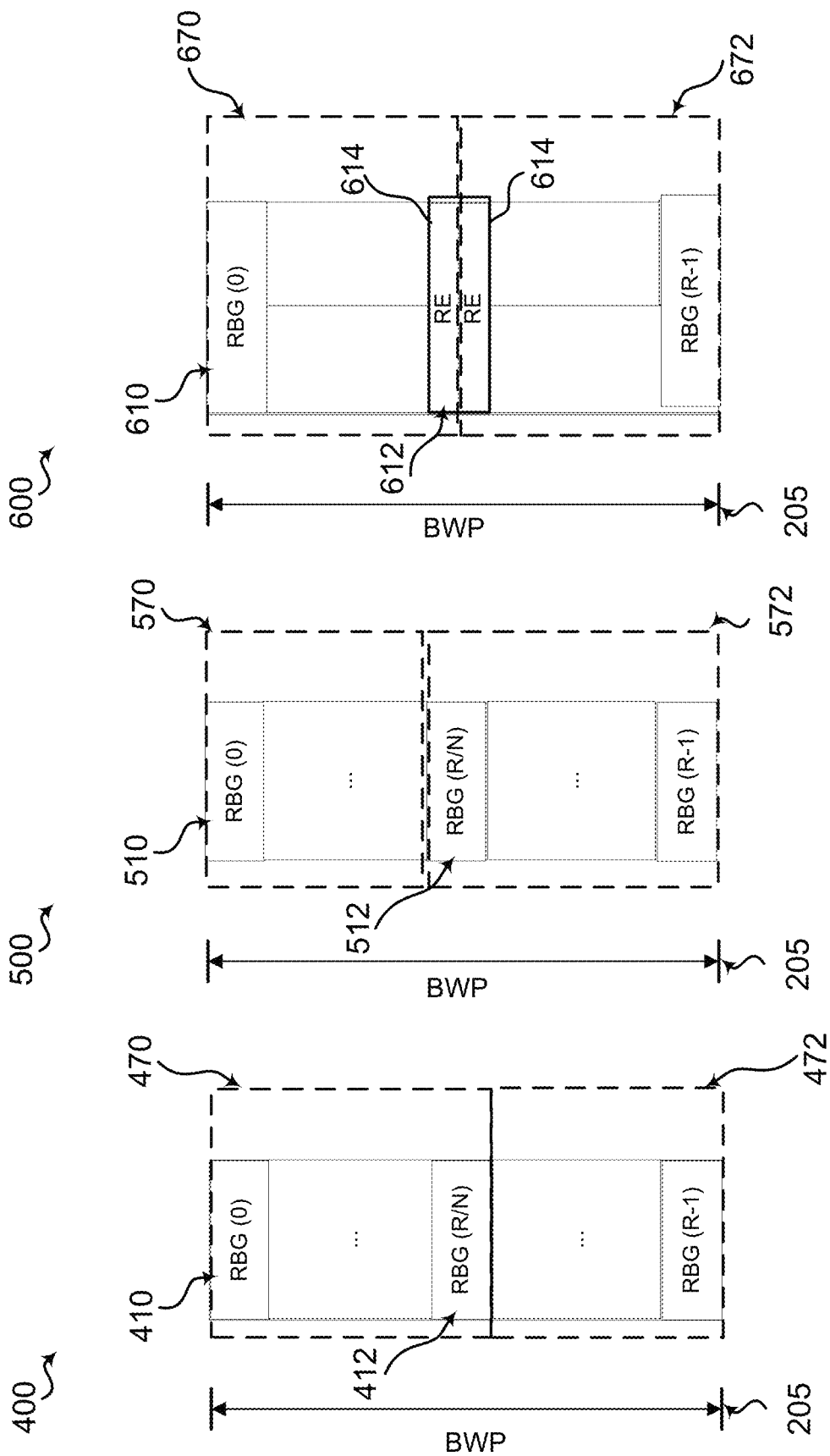

SUB-BAND CONFIGURATION FOR PREEMPTION INDICATION TO EMBB UES

CLAIM OF PRIORITY UNDER 35 U.S.C. § 119

This application claims priority to U.S. Provisional Application No. 62/591,615, titled "SUB-BAND CONFIGURATION FOR PREEMPTION INDICATION TO EMBB UES," filed Nov. 28, 2017, which is assigned to the assignee hereof, and incorporated herein by reference in its entirety.

BACKGROUND

Aspects of the present disclosure relate generally to wireless communication systems, and more particularly, to multiplexing communications within a set of resources.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

A base station may provide both eMBB and URLLC services using the same resources. A user equipment (UE) configured to receive one of the eMBB or URLLC service may be unaware of whether one or more resources is used for eMBB or URLLC. Accordingly, it would be desirable to provide the UE with information regarding a communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, the present disclosure provides a method of wireless communications. The method may include receiving, at a user equipment (UE), an indication channel identifying one or more resources defined by time domain parts and frequency domain parts that have been punctured by an Ultra-Reliable Low latency Communication (URLLC) transmission. The number of frequency domain parts may be greater than or equal to two. The method may include determining a number of resource block groups (RBGs) in an active band width part (BWP) of the UE. The method may include mapping the RBGs in the BWP among each of a number of sub-bands equal to the number of frequency domain parts based on a pre-defined rule.

In another aspect, the disclosure provides a UE for wireless communications. The UE may include a transceiver, a memory, and a processor communicatively coupled with the transceiver and the memory. The processor and the memory may be configured to receive an indication channel identifying one or more resources defined by time domain parts and frequency domain parts that have been punctured by an URLLC transmission. The number of frequency domain parts may be greater than or equal to two. The processor and the memory may be configured to determine a number of RBGs in an active BWP of the UE. The processor and the memory may be configured to map the RBGs in the BWP among each of a number of sub-bands equal to the number of frequency domain parts based on a pre-defined rule.

In another aspect, the disclosure provides a UE for wireless communications. The UE may include means for receiving, at the UE, an indication channel identifying one or more resources defined by time domain parts and frequency domain parts that have been punctured by an URLLC transmission. The number of frequency domain parts may be greater than or equal to two. The UE may include means for determining a number of RBGs in an active BWP of the UE. The UE may include means for mapping the RBGs in the BWP among each of a number of sub-bands equal to the number of frequency domain parts based on a pre-defined rule.

In another aspect, the disclosure provides a computer-readable medium storing computer code executable by a processor for wireless communications. The computer-readable medium may include code for receiving, at a UE, an indication channel identifying one or more resources defined by time domain parts and frequency domain parts that have been punctured by an URLLC transmission. The number of frequency domain parts may be greater than or equal to two. The computer-readable medium may include code for determining a number of RBGs in an active BWP of the UE. The computer-readable medium may include code for mapping the RBGs in the BWP among each of a number of sub-bands equal to the number of frequency domain parts based on a pre-defined rule.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is a conceptual diagram illustrating a first predefined rule for mapping resources to sub-bands, in accordance with various aspects of the present disclosure;

FIG. 5 is a conceptual diagram illustrating a first predefined rule for mapping resources to sub-bands, in accordance with various aspects of the present disclosure;

FIG. 6 is a conceptual diagram illustrating a first predefined rule for mapping resources to sub-bands, in accordance with various aspects of the present disclosure;

DETAILED DESCRIPTION

Figure 1:
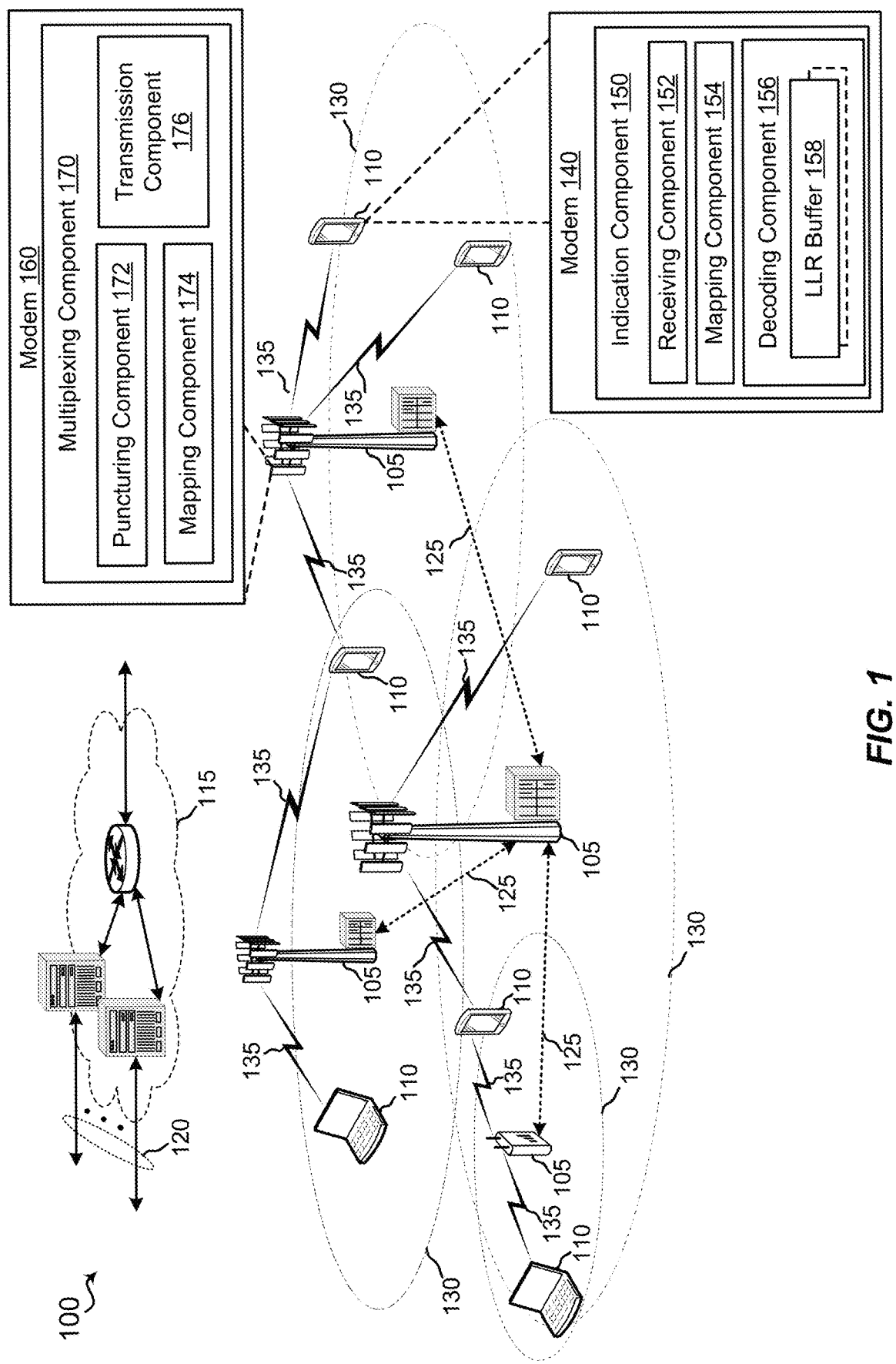
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to a mini-slot indication channel for multiplexing between eMBB and URLLC communications that provides an indication of whether an URLLC transmission is present in a mini-slot. The mini-slot indication channel may be referred to as a "thin indication channel," "mini-slot indication channel," or simply "indication channel." Generally, eMBB communications may operate on a frame structure including slots. Each slot may include a plurality of symbols (e.g., OFDM symbols) defined by an eMBB numerology. URLLC communications may operate on a different frame structure than eMBB communications and use a shorter transmission time interval, which may be referred to as a mini-slot. In an aspect, the duration of a mini-slot may be the symbol period of the eMBB numerology, which may be the same or different than an URLLC numerology. For example, the URLLC communications may use a second numerology that defines symbols having a shorter period than symbols of the eMBB numerology. In another aspect, the URLLC communications may use the eMBB numerology and the transmission time interval for URLLC communications may be a smaller number of symbols (e.g., 2). In either case, the eMBB slot may include multiple mini-slots. In an aspect, the URLLC numerology may be scaled with respect to the eMBB numerology. For example, the symbol period of the eMBB numerology may be a multiple of the symbol period of the URLLC numerology. Accordingly, a number of URLLC symbols may be transmitted during the eMBB symbol period.

Due to the shorter duration and bursty nature of URLLC traffic, the base station may schedule URLLC traffic within an ongoing eMBB slot. Further, the base station may allocate time and frequency resources to either eMBB transmissions or URLLC transmissions. When the URLLC traffic is to be transmitted during the ongoing eMBB slot, some resources already assigned to the eMBB traffic may be given up in order to accommodate the URLLC transmission. In particular, a base station may puncture eMBB transmissions in order to transmit an URLLC transmission within a latency limit. As used herein, the term "puncture" may refer to transmitting the URLLC transmission on one or more resources instead of transmitting a previously scheduled eMBB transmission on the one or more resources.

The indication channel that may carry a message that indicates to a UE whether resources within an eMBB slot have been punctured by an URLLC transmission. The indication channel may carry a fixed payload size within group-common downlink control information (DCI). The fixed payload size may exclude CRC and potentially reserved bits. For example, the indication channel may carry a bitmap indicating whether one or more time domain parts (e.g., symbol periods) and one or more frequency domain parts (e.g., sub-bands) have been punctured by an URLLC transmission. In an aspect, a single frequency domain part may be defined and each bit of the bitmap may be associated with a time domain part. For example, in a slot having 14 symbol periods, a 14-bit bitmap may include one bit corresponding to each symbol period. The value of the bit may indicate whether the time domain part has been punctured. In another aspect, two frequency domain parts may be defined and half of the bits may be applicable to a first sub-band and the other half of the bits may be applicable to a second sub-band. Each bit may be applicable to a longer time domain part (e.g., 2 symbol periods).

The frequency domain resources allocated to a UE at a given time may vary. In an aspect, a carrier may be split into multiple parts. A UE may be associated with a bandwidth part (BWP) defining frequency domain resources for the UE to receive. The BWP may be divided into resource elements (RE) grouped into resource block groups (RBGs). When the indication channel indicates a single frequency domain part, the UE may determine that the indication is applicable to the entire active BWP. When the indication channel indicates two or more frequency domain parts, the UE may determine to which RBGs or REs of the BWP each bit of the bitmap is applicable.

In an aspect, when the BWP includes a number of RBGs that is an integer multiple of the number of frequency domain parts (e.g., an even number in the case of 2 frequency domain parts), the UE may divide the BWP into sub-bands including an equal number of RBGs. The UE may then determine which RBGs are punctured based on the bitmap. When the BWP includes a number of RBGs that is not an integer multiple of the number of frequency domain parts (e.g., an odd number in the case of 2 frequency domain parts), the UE may deterministically decide to which RBGs or REs to apply the indication according to a sub-band selection rule. According to a first sub-band selection rule, a middle RBG may be considered a part of the first sub-band. According to a second sub-band selection rule, the middle RBG may be considered a part of the second sub-band. According to a third sub-band selection rule, the middle RBG may be divided according to individual REs with a first part of the REs in the middle RBG considered part of the first sub-band and a second part of the REs in the middle RBG considered part of the second sub-band.

The UE configured to receive the eMBB transmission (i.e., an eMBB UE) may determine the punctured resources based on the indication and disregard the punctured resources to improve decoding. For example, the UE may set log likelihood ratios corresponding to the punctured resources to zero. Alternatively, the UE may determine to stop processing the punctured resources.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., 5G NR) communications over a shared radio frequency spectrum band. The description below, however, describes a 5G NR system for purposes of example, and 5G NR terminology is used in much of the description below, although the techniques are applicable beyond 5G NR applications (e.g., to other 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects of the present disclosure, an example wireless communication network 100 includes at least one UE 110 with a modem 140 having an indication component 150 that processes a received eMBB slot based on an indication channel indicating punctured resources within the eMBB slot. The indication component 150 may include a receiving component 152 for receiving the indication channel indicating punctured resources within an eMBB slot, mapping component 154 for mapping the resources indicated by the indication channel to sub-bands based on a pre-defined rule, a decoding component 156 processing received resource blocks, and at least one log likelihood ratio (LLR) buffer 158 for intermediate storage of processed resource blocks. Further, wireless communication network 100 includes at least one base station 105 with a modem 160 having a multiplexing component 170 that transmits the indication channel regarding whether the eMBB was punctured by URLLC communications. The multiplexing component 170 may include a puncturing component 172 for puncturing an eMBB transmission with an URLLC transmission, a mapping component 174 for mapping the punctured resources to an indication channel format, and a transmission component 176 for transmitting the indication channel. Thus, according to the present disclosure, the base station 105 may multiplex URLLC transmissions onto eMBB resources and may indicate to a UE that one or more resources within an eMBB slot include the URLLC transmission to assist the UEs with decoding.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. In an aspect, for example, the core network 115 may be an LTE evolved packet core (EPC) or a 5G core (5GC). The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in the wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 7:
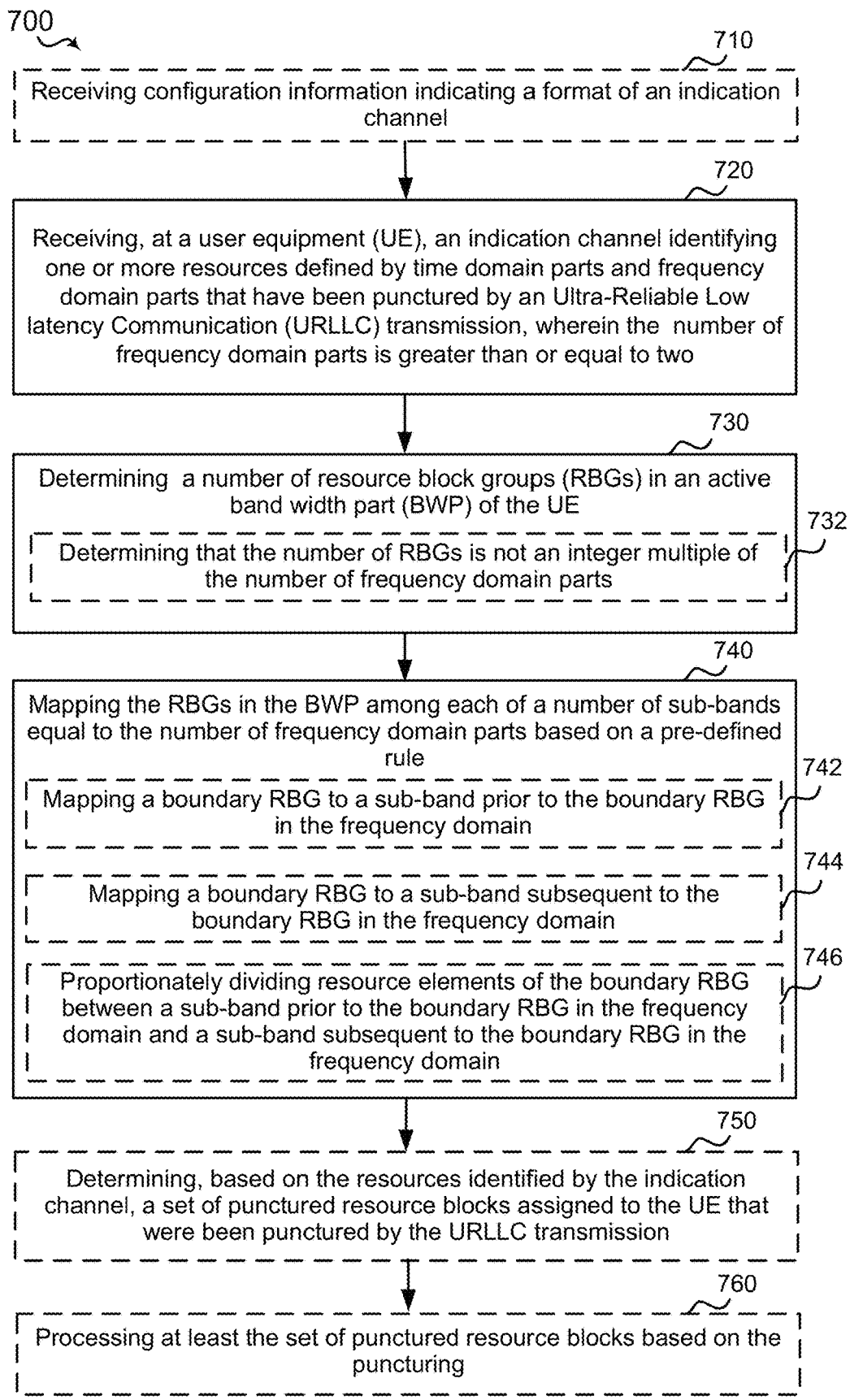
FIG. 7 is a flowchart illustrating an example method of receiving an indication channel at a UE, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIG. 7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
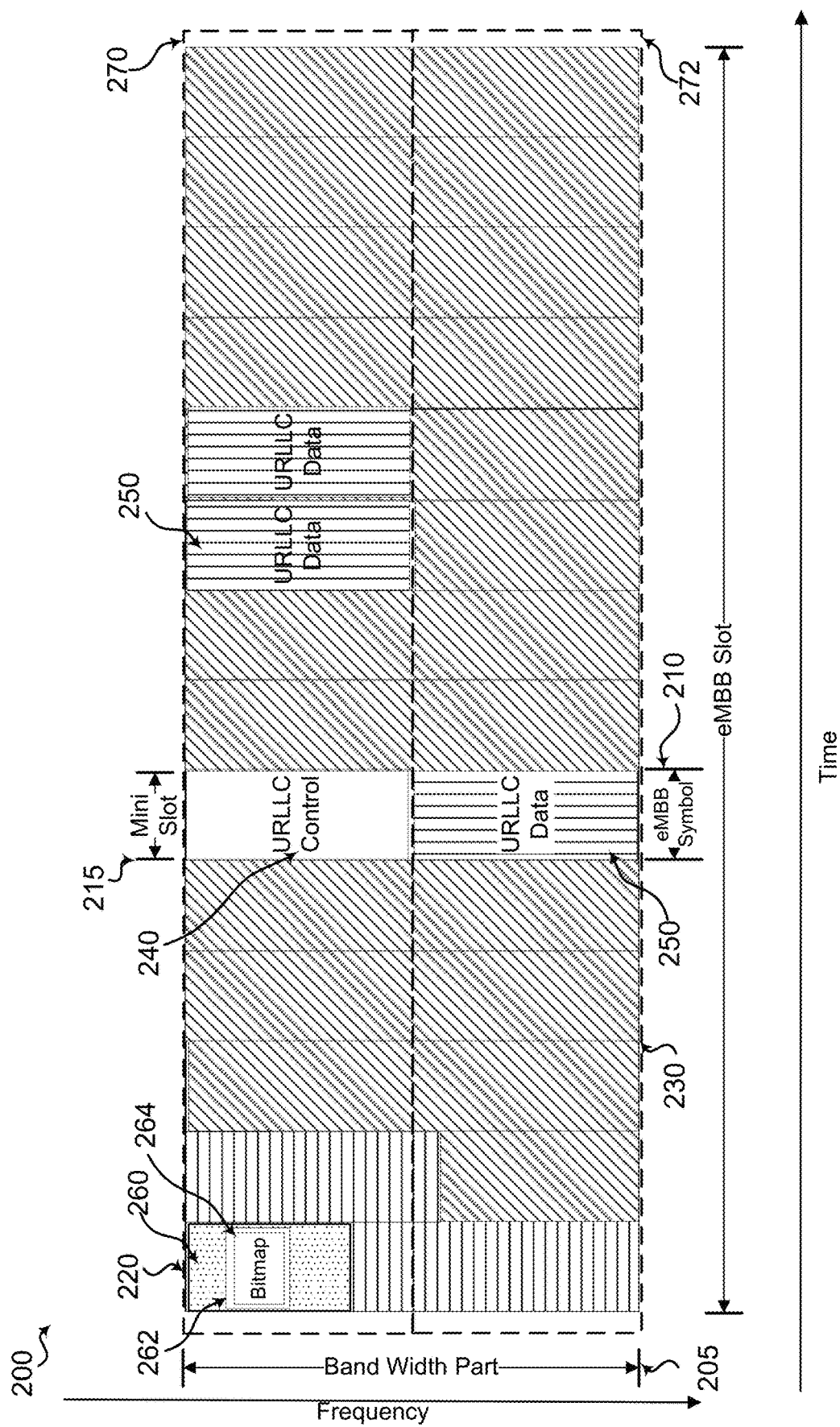
FIG. 2 is a conceptual diagram illustrating an example transmission slot, in accordance with various aspects of the present disclosure.

FIG. 2 illustrates a resource diagram showing an example of an eMBB slot 200 multiplexed with URLLC transmissions. In the time domain, the eMBB slot 200 may include multiple eMBB symbol periods 210. For example, the illustrated eMBB slot 200 includes 14 eMBB symbol periods 210. In the frequency domain, the bandwidth may be divided into sub-carriers. An OFDM numerology may include a combination of a symbol period and sub-carrier spacing that produces orthogonal symbols. The combination of sub-carrier and symbol period may be referred to as a resource element (RE), which may be allocated by a base station 105. Multiple RE (e.g., 12) may be grouped into a resource block. A resource block group (RBG) may include multiple symbols for a resource block. An eMBB transmission in the eMBB slot 200 may include an eMBB control channel 220 and an eMBB data channel 230.

In an aspect, the base station 105 may multiplex an URLLC transmission with the eMBB transmission by puncturing one or more symbols of the eMBB transmission. For example, the base station 105 may transmit an URLLC control channel 240 and URLLC data channel 250 instead of a scheduled symbol of the eMBB transmission. In an aspect, the URLLC transmission may be transmitted during a mini-slot 215 that may have a duration equal to the eMBB symbol period 210. Accordingly, the URLLC transmission may puncture certain REs. By puncturing a scheduled eMBB transmission, the base station may meet low latency requirements for the URLLC transmission, for example, because the URLLC transmission does not wait for the next eMBB slot. The puncturing of an eMBB transmission, however, may also affect a UE attempting to receive the eMBB transmission. In particular, if the UE is unaware that the eMBB transmission has been punctured, the UE may attempt to decode the eMBB transmission based on the URLLC transmission. Because the URLLC transmission carries different data using a different format, attempting to decode the URLLC transmission as an eMBB symbol may decrease the chances of correctly decoding the eMBB transmission when combined with other symbols. The UE may improve decoding performance of the eMBB transmission by ignoring the content of the URLLC transmission.

According to an aspect of the disclosure, the indication channel 262 may be provided to inform UEs of whether a mini-slot includes an URLLC transmission. The indication channel 262 may be transmitted on a configured set of reserved resources within the eMBB slot 200. In an aspect, the indication channel 262 may be transmitted on the eMBB control channel 220 as part of the DCI 260. The indication channel 262 may provide information regarding an URLLC transmission in a previous slot. Accordingly, the indication channel 262 may be referred to as a post indication channel. In another aspect, an indication channel may be transmitted as a current indication channel within a current eMBB slot using reserved resources to indicate that a current mini-slot includes an URLLC transmission. In yet another aspect, the indication channel 262 may indicate which eMBB symbols of the current eMBB slot 200 will be punctured by an URLLC transmission.

In an aspect, one purpose of enabling the indication channel 262 is for UEs configured for eMBB communication (also referred to as eMBB UEs) to infer which time/frequency resources assigned to them have been punctured by URLLC traffic. Accordingly, the indication channel 262 may be decodable at the eMBB UEs. For example, the indication channel 262 may follow the numerology of the eMBB service. The indication channel 262 may declare whether a portion of the previous slot was used for an URLLC transmission by including bitmap 264. For example, the bitmap 264 may be a fixed length bitmap indicating whether one or more frequency domain parts (N) and one or more time domain parts (M) was punctured by an URLLC transmission. The term "part" may refer to any division in the respective domain. For example, a frequency domain part may be referred to as a bandwidth, bandwidth part, band, subband, carrier, sub-carrier, or spacing. A time domain part may be referred to, for example, as a frame, sub-frame, slot, mini-slot, period, symbol period, or transmission opportunity. In an aspect, the fixed length may be 14 bits. In one configuration, a combination of {M=14, N=1} may be used. That is, each bit in the bitmap 264 may indicate whether an eMBB symbol period 210 was punctured. For example, for the eMBB slot 200 illustrated in FIG. 2, the bitmap according to the first configuration {14, 1} may be 00000100110000. In another configuration, a combination of {M=7, N=2} may be used. That is, the band width part (BWP) 205 may be divided into a first sub-band 270 and a second sub-band 272. Each bit in the bitmap 264 may indicate whether a two symbol length period was punctured on one of the sub-bands. The bits may alternate sub-bands, but other arrangements may be alternatively specified. For example, for the eMBB slot 200 illustrated in FIG. 2, the bitmap according to the second configuration {7, 2} may be 001100100000. The base station 105 may signal the configuration of the bitmap as RRC signaling.

The indication channel 262 may be transmitted in either a broadcast manner or a unicast manner. When transmitted in a broadcast manner, all eMBB users may be able to decode and benefit from the indication channel 262. Accordingly, the indication channel 262 may only indicate the presence of URLLC traffic within resources of the eMBB slot. URLLC users may also be able to decode a broadcast indication channel 262. When transmitted in a unicast manner, the indication channel may provide information for a specific UE or a group of UEs. Other UEs may be unable to use the indication channel 262. The intended users may decode the indication channel 262 and infer which time/frequency resources are punctured. Because the unicast indication channel is intended for an eMBB UE or group of eMBB UEs, URLLC users may not be able to decode the unicast indication channel 262.

The bitmap 264 may indicate which sub-bands were punctured by an URLLC communication. However, due to the dynamic size of the band width part (BWP) 205, the mapping of sub-bands to REs or RBGs may change. For example, if the BWP 205 were to double in size, the fixed size of the bitmap 264 may remain the same. Accordingly, first sub-band 270 may refer to all of the original REs or RBGs and the second sub-band 272 may refer to all of the new REs or RBGs.

The indication component 150 may execute the mapping component 154 to determine how to map the sub-bands to REs or RBGs. In a case where the number of sub-bands (N) is an integer multiple of the number of RBGs in the BWP 205, the mapping component 154 may map each sub-band to a consecutive number of RBGs equal to the multiple. Each sub-band may cover an equal number of RBGs. In the case where the number of sub-bands (N) is not an integer multiple of the number of RBGs in the BWP 205, the mapping component 154 may use a pre-defined mapping rule to map the RBGs to the sub-bands. The mapping rule may be pre-defined, for example, by a standard. In another aspect, the mapping rule may be pre-defined by the base station 105 and broadcast, for example, as system information.

Figure 3:
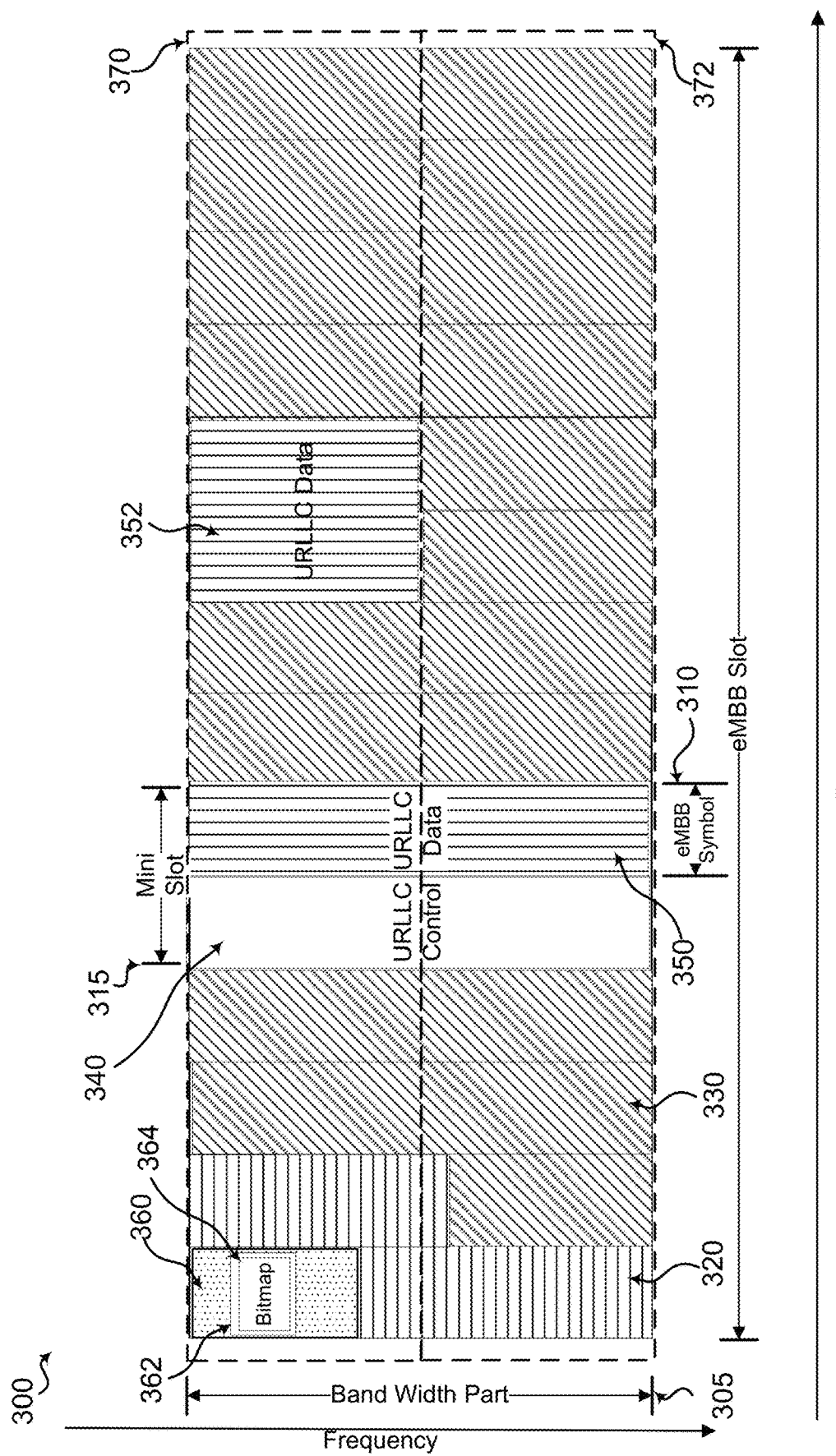
FIG. 3 is a conceptual diagram illustrating another example transmission slot, in accordance with various aspects of the present disclosure.

FIG. 3 illustrates a resource diagram showing another example of an eMBB slot 300 multiplexed with URLLC transmissions. In the time domain, the eMBB slot 300 may include multiple eMBB symbol periods 310. For example, the illustrated eMBB slot 300 includes 14 eMBB symbol periods 310. In the frequency domain, the active BWP 305 may be divided into sub-bands 370 and 372. An eMBB transmission in the eMBB slot 300 may include an eMBB control channel 320 and an eMBB data channel 330.

In an aspect, the base station 105 may multiplex an URLLC transmission with the eMBB transmission by puncturing one or more symbols of the eMBB transmission. For example, the base station 105 may transmit an URLLC control channel 340 and URLLC data channel 350 instead of scheduled symbols of the eMBB transmission. In an aspect, the URLLC transmission may be transmitted during a mini-slot 315 that may have a duration equal to two eMBB symbols periods 310. For example, the URLLC control channel 340 and the URLLC data channel 350 may be transmitted in the third mini-slot 315 by puncturing the eMBB symbols across the BWP 305. Another URLLC data channel 352 may be transmitted in the fifth mini-slot. The URLLC data channel 352 may puncture only the symbols in the sub-band 370.

As discussed above, the bitmap 364 of an indication channel 362 in the DCI 360 on the eMBB control channel 320 may indicate which resources were punctured by the URLLC transmissions. For example, for the eMBB slot 300 illustrated in FIG. 3, the bitmap according to the first configuration {14, 1} may be 00001100110000. In another configuration, a combination of {M=7, N=2} may be used. That is, the BWP 305 may be divided into a first sub-band 370 and a second sub-band 372. Each bit in the bitmap 364 may indicate whether a two symbol length period was punctured on one of the sub-bands. The bits may alternate sub-bands, but other arrangements may be alternatively specified. For example, for the eMBB slot 300 illustrated in FIG. 3, the bitmap 364 according to the second configuration {7, 2} may be 00001100100000. The base station 105 may signal the configuration of the bitmap as RRC signaling. In this example, by using the second configuration {7, 2}, the bitmap 364 may indicate that the second sub-band 372 is not punctured in the fifth mini-slot.

FIG. 4 illustrates a scenario 400 according to a first mapping rule. In the illustrated scenario, the bitmap configuration may indicate two sub-bands (N=2). The BWP 205 may be configured to include a number or RBGs (R), which may be indexed from RBG (0) to RBG (R-1). R may be an odd number (i.e., not an integer multiple of N). Accordingly, R cannot be divided into even groups of RBGs. The first mapping rule may map a boundary RBG 412 to the first sub-band 470, which is prior to the boundary RBG 412 in the frequency domain. The boundary RBG 412 may be an RBG having an index of R/N using integer division (i.e., any remaining part is dropped). In the case of two frequency domain parts, the boundary RBG 412 may be a middle RBG. Accordingly, the first sub-band 470 may have a greater number of RBG 410 than the second sub-band 472.

FIG. 5 illustrates a scenario 500 according to a second mapping rule. In the illustrated scenario, the bitmap configuration may indicate two sub-bands (N=2). The BWP 205 may be configured to include a number or RBGs (R), which may be indexed from RBG (0) to RBG (R-1). R may be an odd number (i.e., not an integer multiple of N). Accordingly, R cannot be divided into even groups of RBGs. The second mapping rule may map a boundary RBG 512 to the second sub-band 572, which is subsequent to the boundary RBG 512 in the frequency domain. The boundary RBG 512 may have an index of R/N using integer division (i.e., any remaining part is dropped). Accordingly, the second sub-band 572 may have a greater number of RBGs 510 than the first sub-band 574.

FIG. 6 illustrates a scenario 600 according to a third mapping rule. In the illustrated scenario, the bitmap configuration may indicate two sub-bands (N=2). The BWP 205 may be configured to include a number or RBGs (R), which may be indexed from RBG (0) to RBG (R-1). R may be an odd number (i.e., not an integer multiple of N). Accordingly, R cannot be divided into even groups of RBGs. The second mapping rule may divide a boundary RBG 612 into resource elements 614. For example, the boundary RBG 612 may have an index of R/N using integer division (i.e., any remaining part is dropped). The third mapping rule may map the resource elements 614 proportionately to different sub-bands. In this case, each sub-band 670, 672 may be allocated an equal number of resource elements 614 of the boundary RBG 612. Accordingly, the first sub-band 672 and the second sub-band 674 may have an equal number of resource elements.

Although FIGS. 4-6 illustrate scenarios with two frequency domain parts, the mapping rules may be extended for greater numbers of frequency domain parts. Instead of applying to a middle RBG with index (R/2), a boundary RBG may be defined having an index of floor (R/N), and the mapping rules may be used to determine whether the boundary RBG is included in a previous sub-band, included in a subsequent sub-band, or divided proportionately by REs.

Referring to FIG. 7, for example, a method 700 of wireless communication in operating UE 110 according to the above-described aspects to receive an indication channel includes one or more of the herein-defined actions. The actions may be executed by a processor of the UE 110 such as the processors 712 (FIG. 7).

For example, at block 710, the method 700 optionally includes receiving configuration information indicating a format of an indication channel. For instance, in an aspect, the UE 110 may execute the receiving component 152 to receive configuration information indicating a format of an indication channel. The format may be, for example, the {14, 1} configuration, the {7, 2} configuration, or another combination of M and N. The configuration information may be received via RRC signaling. An index of the selected format may be transmitted to minimize payload. The indication component 150 may use a look up table to determine the selected format.

At block 720, the method 700 may include receiving, at a UE, an indication channel identifying one or more resources defined by time domain parts and frequency domain parts that have been punctured by an URLLC transmission, wherein a number of frequency domain parts is greater than or equal to two. In an aspect, for example, the UE 110 may execute the receiving component 152 to receive the indication channel 262 identifying one or more resources defined by time domain parts and frequency domain parts that have been punctured by an URLLC transmission. The number of frequency domain parts may greater than or equal to two. For example, the configuration information for the indication channel may be {7, 2} or another configuration having N greater than or equal to 2. The indication channel 262 may carry a bitmap 264 having one bit corresponding to each combination of a frequency domain part and a time domain part. The indication channel 262 may be transmitted on the eMBB control channel 220 as part of the DCI 260.

At block 730, the method 700 may include determining a number of RBGs in an active BWP of the UE. For instance, in an aspect, UE 110 may execute the mapping component 154 to determine the number of RBGs (R) in the active BWP 205 of the UE 110. In an aspect, in sub-block 732, determining the number of RBGs may include determining that the active BWP of the UE includes a number of RBGs that is not an integer multiple of the number of frequency domain parts. For instance, in an aspect, UE 110 may execute the mapping component 154 to determine that the active BWP 205 of the UE 110 includes a number of RBGs (R) that is not an integer multiple of the number of frequency domain parts (N).

At block 740, the method 700 may include mapping the RBGs in the BWP among each of a number of sub-bands equal to the number of frequency domain parts based on a pre-defined rule. In an aspect, for example, the UE 110 may execute the mapping component 154 to map the RBGs 410, 510, 610 in the BWP 205 among each of a number of sub-bands 270, 272 equal to the number of frequency domain parts based on a pre-defined rule. In an aspect, the pre-defined rule defines a mapping of a boundary RBG in the BWP to one of the number of sub-bands. For example, in sub-block 742, the block 740 may optionally include mapping a boundary RBG to a sub-band prior to the boundary RBG in the frequency domain. For instance, the mapping rule may map the boundary RBG 412 to the first sub-band 470 prior to the boundary RBG 412 in the frequency domain. In another example, in sub-block 744, the block 740 may optionally include mapping a boundary RBG to a sub-band subsequent to the boundary RBG in the frequency domain. For instance, the pre-defined rule may map the boundary RBG 512 to the second sub-band 572 subsequent to the boundary RBG 512 in the frequency domain. In another example, in sub-block 746, the block 740 may optionally include proportionately dividing resource elements of the boundary RBG between a sub-band prior to the boundary RBG in the frequency domain and a sub-band subsequent to the boundary RBG in the frequency domain. For instance, the pre-defined rule may proportionately divide resource elements 614 of the boundary RBG 612 between a sub-band 670 prior to the boundary RBG 612 in the frequency domain and a sub-band 672 subsequent to the boundary RBG 612 in the frequency domain.

In block 750, the method 700 may optionally include determining, based on the resources identified by the indication channel, a set of punctured resource blocks assigned to the UE that were been punctured by the URLLC transmission. In an aspect, for example, the UE 110 may execute the mapping component 154 to determine the set of punctured resource blocks based on the resources identified by the indication channel 262, 362. For example, the mapping component 154 may determine resource blocks corresponding to each 1 bit of the bitmap 264, 364 and include the determined resource blocks in the set of punctured resource blocks. The mapping component 154 may determine the frequency domain part indicated by the 1 bit, convert the frequency domain part to a sub-band, then determine that the resource blocks within the sub-band during the time domain part are punctured resource blocks.

In block 760, the method 700 may optionally include processing at least the set of punctured resource blocks based on the puncturing. In an aspect, for example, the UE 110 may execute the decoding component 156 to process at least the set of punctured resource blocks based on the puncturing. For instance, the UE 110 may process LLRs stored in LLR buffer 158 based on whether the corresponding resource block is punctured. For example, for the set of punctured resource blocks, the UE 110 may not further process data received over the punctured resource blocks (e.g., the UE may perform no demodulation, no decoding, etc.). Instead, the UE 110 may simply assume that the LLRs associated with these resource blocks are zero. By avoiding further processing, the UE 110, which is configured to receive an eMBB transmission, can save power. Additionally, processing the punctured resource blocks may include zeroing LLRs corresponding to the punctured resource blocks. In an aspect, for example, the decoding component 156 may zero LLRs stored in the LLR buffer 158 for the resource blocks. Because the stored LLRs correspond to an URLLC communication that is not for the UE, by zeroing the LLRS, the incorrect information will have less of an impact on decoding the eMBB slot.

Figure 8:
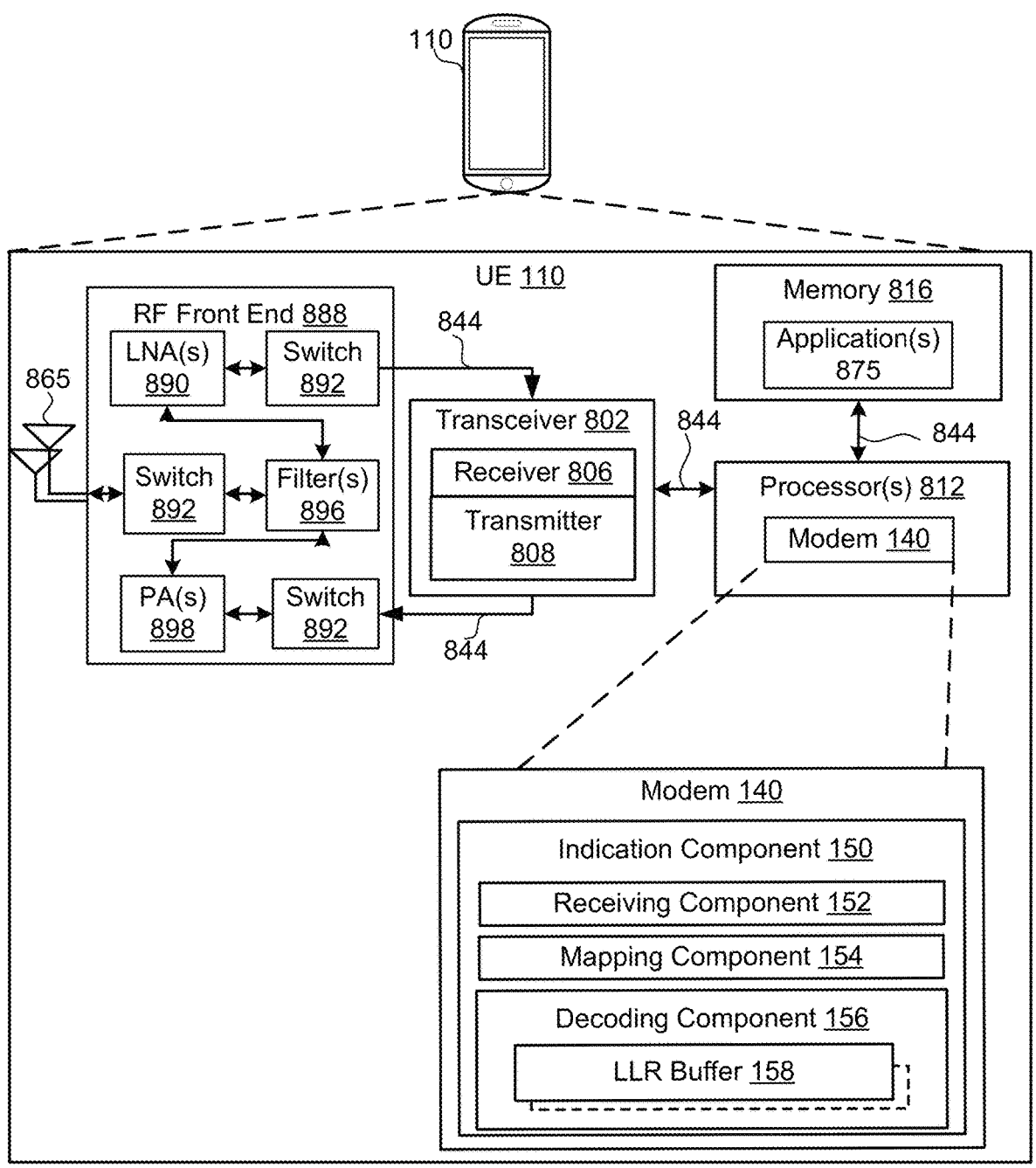
FIG. 8 is a schematic diagram of example components of the UE of FIG. 1.

Referring to FIG. 8, one example of an implementation of UE 110 may include a variety of components, some of which have already been described above, but including components such as one or more processors 812, memory 816, and transceiver 802 in communication via one or more buses 844, which may operate in conjunction with modem 140 and indication component 150 to enable one or more of the functions described herein related to processing a mini-slot based on a received indication channel. Further, the one or more processors 812, modem 140, memory 816, transceiver 802, RF front end 888 and one or more antennas 865, may be configured to support voice and/or data calls (simultaneously or non-simultaneously) in one or more radio access technologies.

In an aspect, the one or more processors 812 can include a modem 140 that uses one or more modem processors. The various functions related to indication component 150 may be included in modem 140 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 140 associated with indication component 150 may be performed by transceiver 802.

Also, memory 816 may be configured to store data used herein and/or local versions of applications 875 or indication component 150 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining indication component 150 and/or one or more of its subcomponents, and/or data associated therewith, when UE 110 is operating at least one processor 812 to execute indication component 150 and/or one or more of its subcomponents.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 105. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may include, but is not limited to, an RF transmitter.

Moreover, in an aspect, UE 110 may include RF front end 888, which may operate in communication with one or more antennas 865 and transceiver 802 for receiving and transmitting radio transmissions, for example, wireless communications transmitted by at least one base station 105 or wireless transmissions transmitted by UE 110. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 802 to operate at a specified frequency and power level based on the UE configuration of the UE 110 and the communication protocol used by modem 140.

In an aspect, modem 140 can be a multiband-multimode modem, which can process digital data and communicate with transceiver 802 such that the digital data is sent and received using transceiver 802. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 9:
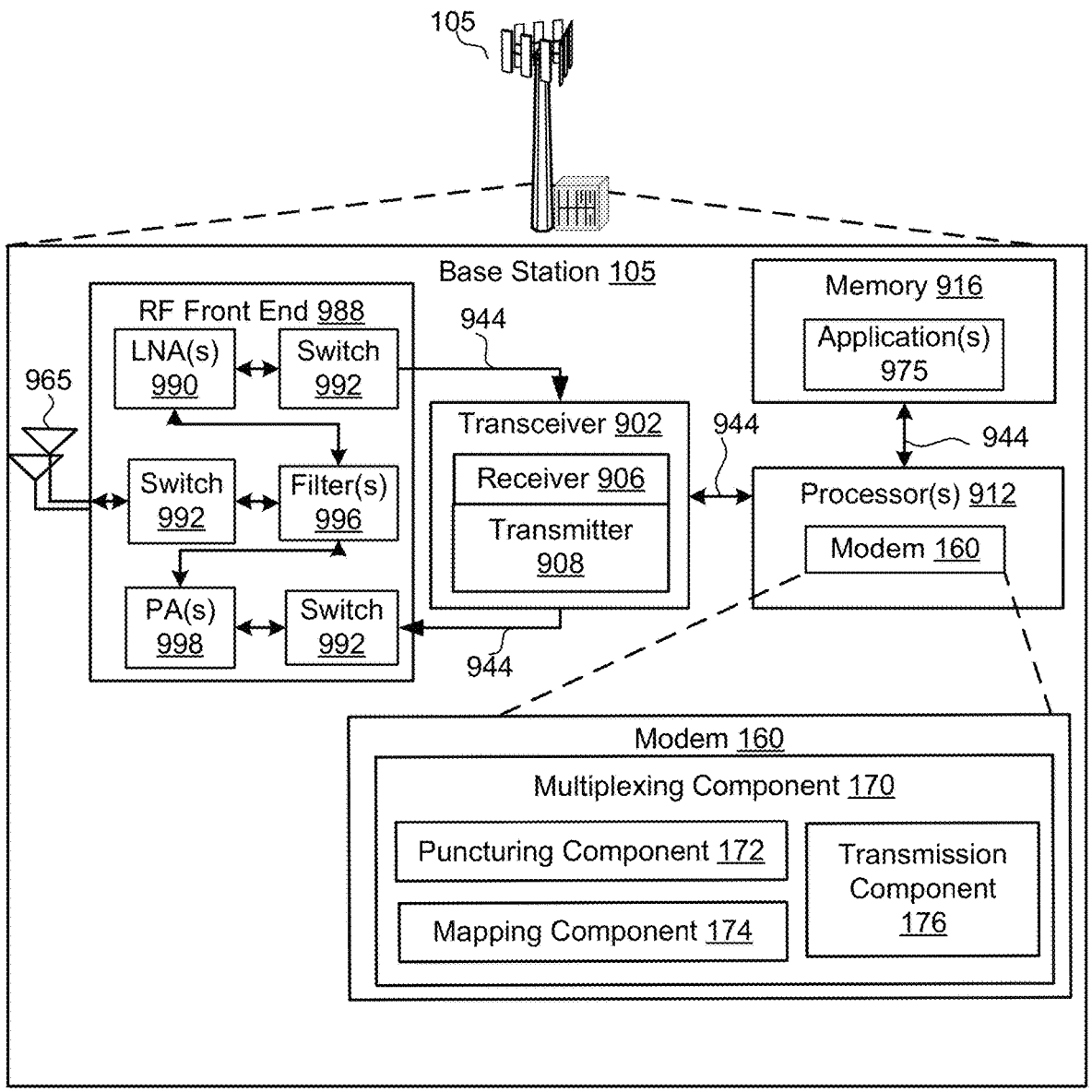
FIG. 9 is a schematic diagram of example components of the base station of FIG. 1.

Referring to FIG. 9, one example of an implementation of base station 105 may include a variety of components, some of which have already been described above, but including components such as one or more processors 912 and memory 916 and transceiver 902 in communication via one or more buses 944, which may operate in conjunction with modem 160 and multiplexing component 170 to enable one or more of the functions described herein related to transmitting an indication channel that indicates whether a current mini-slot includes an URLLC transmission.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
receiving, at a user equipment (UE), an indication channel identifying one or more resources defined by time domain parts and frequency domain parts that have been punctured by a transmission, wherein a number of frequency domain parts is greater than or equal to two;
determining a number of resource block groups (RBGs) in an active band width part (BWP) of the UE; and
mapping the RBGs in the active BWP among each of a number of sub-bands equal to the number of frequency domain parts based on a pre-defined rule, wherein the pre-defined rule defines a mapping of a boundary RBG in the active BWP to a sub-band prior to the boundary RBG in the frequency domain.

2. The method of claim 1, wherein the active BWP includes an odd number of RBGs and the boundary RBG is a middle RBG in the active BWP.

3. The method of claim 1, wherein the boundary RBG has an index into the active BWP that is an integer quotient of the number of RBGs divided by the number of frequency domain parts.

4. The method of claim 3, wherein one or more additional boundary RBGs have an index that is a multiple of the index of the integer quotient of the number of RBGs divided by the number of frequency domain parts, wherein the pre-defined rule is applied to the one or more additional boundary RBGs.

5. The method of claim 1, further comprising:
determining, based on the one or more resources identified by the indication channel, a set of punctured resource blocks assigned to the UE that were been punctured by the transmission; and
processing at least the set of punctured resource blocks based on the puncturing.

6. The method of claim 5, wherein the processing comprises zeroing log likelihood ratios (LLRs) corresponding to the set of punctured resource blocks.

7. The method of claim 5, wherein the processing comprises stopping processing of the set of punctured resource blocks.

8. The method of claim 1, further comprising receiving configuration information indicating a format of the indication channel.

9. A user equipment (UE) for wireless communications, comprising:
a transceiver;
a memory; and
a processor communicatively coupled with the transceiver and the memory, the processor and the memory configured to:
receive an indication channel identifying one or more resources defined by time domain parts and frequency domain parts that have been punctured by a transmission, wherein a number of frequency domain parts is greater than or equal to two;
determine a number of resource block groups (RBGs) in an active band width part (BWP) of the UE; and
map the RBGs in the active BWP among each of a number of sub-bands equal to the number of frequency domain parts based on a pre-defined rule, wherein the pre-defined rule defines a mapping of a boundary RBG in the active BWP to a sub-band prior to the boundary RBG in the frequency domain.

10. The UE of claim 9, wherein the active BWP includes an odd number of RBGs and the boundary RBG is a middle RBG in the active BWP.

11. The UE of claim 9, wherein the boundary RBG has an index into the active BWP that is an integer quotient of the number of RBGs divided by the number of frequency domain parts.

12. The UE of claim 11, wherein one or more additional boundary RBGs have an index that is a multiple of the index of the integer quotient of the number of RBGs divided by the number of frequency domain parts, wherein the pre-defined rule is applied to the one or more additional boundary RBGs.

13. The UE of claim 9, wherein the processor is configured to:
determine, based on the one or more resources identified by the indication channel, a set of punctured resource blocks assigned to the UE that were been punctured by the transmission; and
process at least the set of punctured resource blocks based on the puncturing.

14. The UE of claim 13, wherein the processor is configured to zero log likelihood ratios (LLRs) corresponding to the set of punctured resource blocks.

15. The UE of claim 13, wherein the processor is configured to stop processing of the set of punctured resource blocks.

16. The UE of claim 9, wherein the processor is configured to receive configuration information indicating a format of the indication channel.

17. A user equipment (UE) for wireless communications, comprising:
means for receiving, at the UE, an indication channel identifying one or more resources defined by time domain parts and frequency domain parts that have been punctured by a transmission, wherein a number of frequency domain parts is greater than or equal to two;
means for determining a number of resource block groups (RBGs) in an active band width part (BWP) of the UE; and
means for mapping the RBGs in the active BWP among each of a number of sub-bands equal to the number of frequency domain parts based on a pre-defined rule that defines a mapping of a boundary RBG in the active BWP to one of the number of sub-bands, wherein the pre-defined rule indicates that the boundary RBG is mapped to a sub-band prior to the boundary RBG in the frequency domain, wherein the pre-defined rule defines a mapping of a boundary RBG in the active BWP to a sub-band prior to the boundary RBG in the frequency domain.

18. The UE of claim 17, wherein the active BWP includes an odd number of RBGs and the boundary RBG is a middle RBG in the active BWP.

19. The UE of claim 17, wherein the boundary RBG has an index into the active BWP that is an integer quotient of the number of RBGs divided by the number of frequency domain parts.

20. The UE of claim 19, wherein one or more additional boundary RBGs have an index that is a multiple of the index of the integer quotient of the number of RBGs divided by the number of frequency domain parts, wherein the pre-defined rule is applied to the one or more additional boundary RBGs.

21. The UE of claim 17, further comprising:
means for determining, based on the one or more resources identified by the indication channel, a set of punctured resource blocks assigned to the UE that were been punctured by the transmission; and means for processing at least the set of punctured resource blocks based on the puncturing.

22. A non-transitory computer-readable medium storing computer code executable by a processor for wireless communications, comprising computer executable code for:

receiving, at a user equipment (UE), an indication channel identifying one or more resources defined by time domain parts and frequency domain parts that have been punctured by a transmission, wherein a number of frequency domain parts is greater than or equal to two;

determining a number of resource block groups (RBGs) in an active band width part (BWP) of the UE; and mapping the RBGs in the active BWP among each of a number of sub-bands equal to the number of frequency domain parts based on a pre-defined rule that defines a mapping of a boundary RBG in the active BWP to one of the number of sub-bands, wherein the pre-defined rule indicates that the boundary RBG is mapped to a sub-band prior to the boundary RBG in the frequency domain, wherein the pre-defined rule defines a mapping of a boundary RBG in the active BWP to a sub-band prior to the boundary RBG in the frequency domain.

23. The UE of claim 21, wherein the means for processing is configured to zero log likelihood ratios (LLRs) corresponding to the set of punctured resource blocks.

24. The UE of claim 21, wherein the means for processing is configured to stop processing of the set of punctured resource blocks.

25. The non-transitory computer-readable medium of claim 22, wherein the active BWP includes an odd number of RBGs and the boundary RBG is a middle RBG in the active BWP.

26. The non-transitory computer-readable medium of claim 25, wherein the boundary RBG has an index into the active BWP that is an integer quotient of the number of RBGs divided by the number of frequency domain parts.

27. The non-transitory computer-readable medium of claim 26, wherein one or more additional boundary RBGs have an index that is a multiple of the index of the integer quotient of the number of RBGs divided by the number of frequency domain parts, wherein the pre-defined rule is applied to the one or more additional boundary RBGs.

28. The non-transitory computer-readable medium of claim 22, further comprising code for:

determining, based on the one or more resources identified by the indication channel, a set of punctured resource blocks assigned to the UE that were been punctured by the transmission; and processing at least the set of punctured resource blocks based on the puncturing.

29. The non-transitory computer-readable medium of claim 28, further comprising code for zeroing log likelihood ratios (LLRs) corresponding to the set of punctured resource blocks.

30. The non-transitory computer-readable medium of claim 28, further comprising code for stopping processing of the set of punctured resource blocks.

\* \* \* \* \*